(12) United States Patent
Childress

(10) Patent No.: US 11,745,846 B2
(45) Date of Patent: Sep. 5, 2023

(54) DRY FLOOR HARDENED GRID

(71) Applicant: The Boeing Company, Chicago, IL (US)

(72) Inventor: Jamie Childress, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/488,534

(22) Filed: Sep. 29, 2021

(65) Prior Publication Data

US 2022/0153402 A1    May 19, 2022

Related U.S. Application Data

(60) Provisional application No. 63/115,124, filed on Nov. 18, 2020.

(51) Int. Cl.
*B32B 15/095* (2006.01)
*B32B 15/18* (2006.01)
(Continued)

(52) U.S. Cl.
CPC .............. *B64C 1/18* (2013.01); *B32B 1/02* (2013.01); *B32B 3/266* (2013.01); *B32B 3/30* (2013.01); *B32B 7/12* (2013.01); *B32B 15/095* (2013.01); *B32B 15/18* (2013.01); *B32B 15/20* (2013.01); *B32B 27/06* (2013.01); *B32B 27/40* (2013.01);
(Continued)

(58) Field of Classification Search
CPC .... B64C 1/18; B64C 1/20; B32B 1/02; B32B 3/266; B32B 2305/38; B32B 37/0023; B32B 3/12; B32B 3/30; E03F 5/04; E03F 2005/04; E01C 9/10; E01C 11/225; E01C 11/227; E04F 19/10; A47G 27/02;
(Continued)

(56) References Cited

U.S. PATENT DOCUMENTS 53,997 A * 4/1866 Lozier ................ A47L 23/24
    15/238
3,605,166 A * 9/1971 Chen ................... A47L 23/24
    428/116

(Continued)

FOREIGN PATENT DOCUMENTS

| EP | 3225549 A1 | 10/2017 |
|---|---|---|
| EP | 3594104 A1 | 1/2020 |
| WO | 2019230-828 A1 | 12/2019 |

OTHER PUBLICATIONS

"Strong, lightweight titanium is edging onto steel and aluminum's turf", Nikkei Asia, Biotechnology, Dec. 18, 2016, https://asia.nikkei.com/Business/Biotechnology/Strong-lightweight-titanium-is-edging-onto-steel-and-aluminum-s-turf2 (Year: 2016).*

*Primary Examiner* — Michael C Romanowski
(74) *Attorney, Agent, or Firm* — Felix L. Fischer

(57) ABSTRACT

A laminated dry floor system incorporates a grid having a lattice forming a first array of apertures. A support interlayer is adhered beneath the grid and has a second array of apertures in alignment with the first array, the first array of apertures, second array of apertures and thickness of the support interlayer configured to induce passage of a liquid. A wicking layer is in contact with the support interlayer opposite the grid. A base layer underlies the wicking layer and a pan assembly is configured to receive the base layer.

20 Claims, 9 Drawing Sheets

(51) Int. Cl.
  *B32B 15/20* (2006.01)
  *B32B 3/26* (2006.01)
  *B32B 7/12* (2006.01)
  *B64C 1/18* (2006.01)
  *B32B 27/40* (2006.01)
  *B32B 3/30* (2006.01)
  *B32B 27/06* (2006.01)
  *B32B 1/02* (2006.01)

(52) U.S. Cl.
  CPC ....... *B32B 2250/04* (2013.01); *B32B 2305/38* (2013.01); *B32B 2307/726* (2013.01); *B32B 2307/732* (2013.01); *B32B 2605/18* (2013.01)

(58) Field of Classification Search
  CPC .......... A47L 23/22; A47L 23/24; A47L 23/26; A47L 23/266
  USPC .................................. 206/305; 220/571–573
  See application file for complete search history.

(56) References Cited

U.S. PATENT DOCUMENTS

| | | | | |
|---|---|---|---|---|
| 3,770,560 A * | 11/1973 | Elder | ................ | B32B 3/30 428/116 |
| 3,802,144 A * | 4/1974 | Spica | ................ | E04F 15/10 428/53 |
| 4,433,021 A * | 2/1984 | Riel | ................ | G10K 11/172 428/116 |
| 5,236,241 A * | 8/1993 | Courrege | ................ | B60N 3/042 296/97.23 |
| 5,254,384 A * | 10/1993 | Gordon | ................ | B60N 2/5628 428/95 |
| 5,429,236 A * | 7/1995 | Evans | ................ | B65D 81/261 220/571 |
| 6,102,073 A * | 8/2000 | Williams | ................ | A61M 1/84 137/561 R |
| 6,378,639 B1 * | 4/2002 | Murray | ................ | F16N 31/006 180/69.1 |
| 6,558,769 B1 * | 5/2003 | Chwala | ................ | B32B 3/266 180/69.1 |
| 9,737,045 B1 * | 8/2017 | Scanlan | ................ | A01K 1/011 |
| 2004/0069571 A1 * | 4/2004 | Lee | ................ | A01K 1/0107 184/106 |
| 2006/0070314 A1 * | 4/2006 | Jenkins | ................ | E01C 13/045 52/177 |
| 2008/0280095 A1 | 11/2008 | Wright | | |
| 2009/0241442 A1 * | 10/2009 | MacLean | ................ | A01K 1/0151 52/302.1 |
| 2009/0246502 A1 * | 10/2009 | Hoetzeldt | ................ | B32B 15/02 428/304.4 |
| 2009/0311469 A1 * | 12/2009 | Hotzeldt | ................ | B32B 3/12 428/116 |
| 2010/0272944 A1 * | 10/2010 | Engelhardt | ................ | A47L 23/22 428/68 |
| 2013/0099055 A1 * | 4/2013 | Pfeiffer | ................ | B64D 11/02 244/118.5 |
| 2014/0353855 A1 * | 12/2014 | Sundine | ................ | B64D 11/02 261/119.1 |
| 2017/0129582 A1 * | 5/2017 | Hitchcock | ................ | B64C 1/067 |
| 2017/0283062 A1 * | 10/2017 | Childress | ................ | B08B 5/04 |
| 2018/0015862 A1 * | 1/2018 | Chavez Martinez | .. | B60N 3/048 |
| 2018/0105251 A1 * | 4/2018 | Hitchcock | ................ | B64C 1/067 |
| 2019/0077495 A1 * | 3/2019 | Lange | ................ | B32B 3/30 |
| 2020/0015325 A1 * | 1/2020 | Zhao | ................ | H05B 3/06 |
| 2020/0248463 A1 * | 8/2020 | Metzger | ................ | E04F 15/203 |
| 2021/0214066 A1 * | 7/2021 | Murayama | ................ | B64D 11/02 |

* cited by examiner

DRY FLOOR HARDENED GRID

REFERENCES TO RELATED APPLICATIONS

This application claims priority of U.S. provisional application Ser. No. 63/115,124 filed on Nov. 18, 2020 entitled DRY FLOOR HARDENED GRID, having a common assignee with the present application.

BACKGROUND

Field

The present disclosure relates to dry floor systems for liquid mitigation and more particularly to a laminated support interlayer disposed between an overlying grid and an underlying wicking layer.

Related Art

Maintaining dry floors in entry areas, lavatory facilities, galleys or kitchens and other locations where water or other liquids may be introduced during use, particularly in vehicles of various forms including commercial aircraft, is necessary to provide clean, slip free surfaces. Addressing an aircraft lavatory as an example, during operation of the aircraft various individuals (such as passengers, pilots, and flight attendants) use a lavatory within an internal cabin during a flight. Liquid (e.g., from the sink) may be spilled to the lavatory floor. An aircraft lavatory is generally cleaned between flights. For example, maintenance or cleaning personnel board the aircraft on the ground before and/or after a flight to clean the lavatory. However, during a flight, the lavatory is typically not cleaned, despite the fact that numerous individuals may use the lavatory during the flight. While flight attendants may be able to clean the lavatory, they are usually preoccupied with other duties during the flight. As such, cleaning the lavatory may not be a top priority for flight attendants during a flight or even between flights. Consequently, the dryness of lavatory floors onboard an aircraft may be compromised, particularly during long flights.

To address the issues of containing water on floor surfaces, such as in the example of the lavatories, various absorbent mats or grills allowing water to be absorbed or pass through have been employed. However, durability of such devices is often insufficient. Flight attendants and passengers often wear shoes having heals with small contact area such as spike or stiletto heals. Openings in grills must therefore be small to prevent catching of such heals. However, mats or small grills are often insufficiently robust to withstand heavy traffic and high-pressure contacts during use.

SUMMARY

The implementations disclosed herein provide a laminated dry floor system incorporates a grid having a lattice forming a first array of apertures. A support interlayer is adhered beneath the grid and has a second array of apertures in alignment with the first array, the first array of apertures, second array of apertures and thickness of the support interlayer configured to induce passage of a liquid. A wicking layer is in contact with the support interlayer opposite the grid. A base layer underlies the wicking layer and a pan assembly is configured to receive the base layer.

The implementations provide a method for maintaining a dry floor by supporting a grid with a support interlayer adhered beneath the grid. Liquid is received in the grid, the grid having a lattice forming a first array of apertures. The support interlayer has a second array of apertures concentrically aligned with the first array of apertures. The liquid is received through the second array of apertures, the support interlayer having a thickness configured to induce contact of the liquid with a wicking layer adhered to a lower surface of the support interlayer.

The features, functions, and advantages that have been discussed may be achieved independently in various implementations or may be combined in other implementations further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure relates to a liquid mitigation system referred to herein as a dry floor system having a grid assembly including a laminated support interlayer disposed between an overlying grid as a top layer and an underlying wicking layer to increase the durability of the grid. The support interlayer employs an array of apertures to match an array of apertures in the structure of the grid and may be fabricated from titanium, aluminum, stainless steel or other such material. The support interlayer is bonded to the grid, typically with an adhesive, and is positioned on top the underlying wicking layer which may be carbon veil backing or a similar material. A rigid base layer, typically of steel or similar material is employed as a bottom lamination beneath the wicking layer. A dished pan receives the laminated layers and may have sufficient depth to include an absorbent pad or desiccant bag beneath the laminated layers. The dished pan may include frame elements to mount and removeably constrain the laminated layers as well as secure the overall dry floor assembly to the underlying floor or structure.

Figure 1:
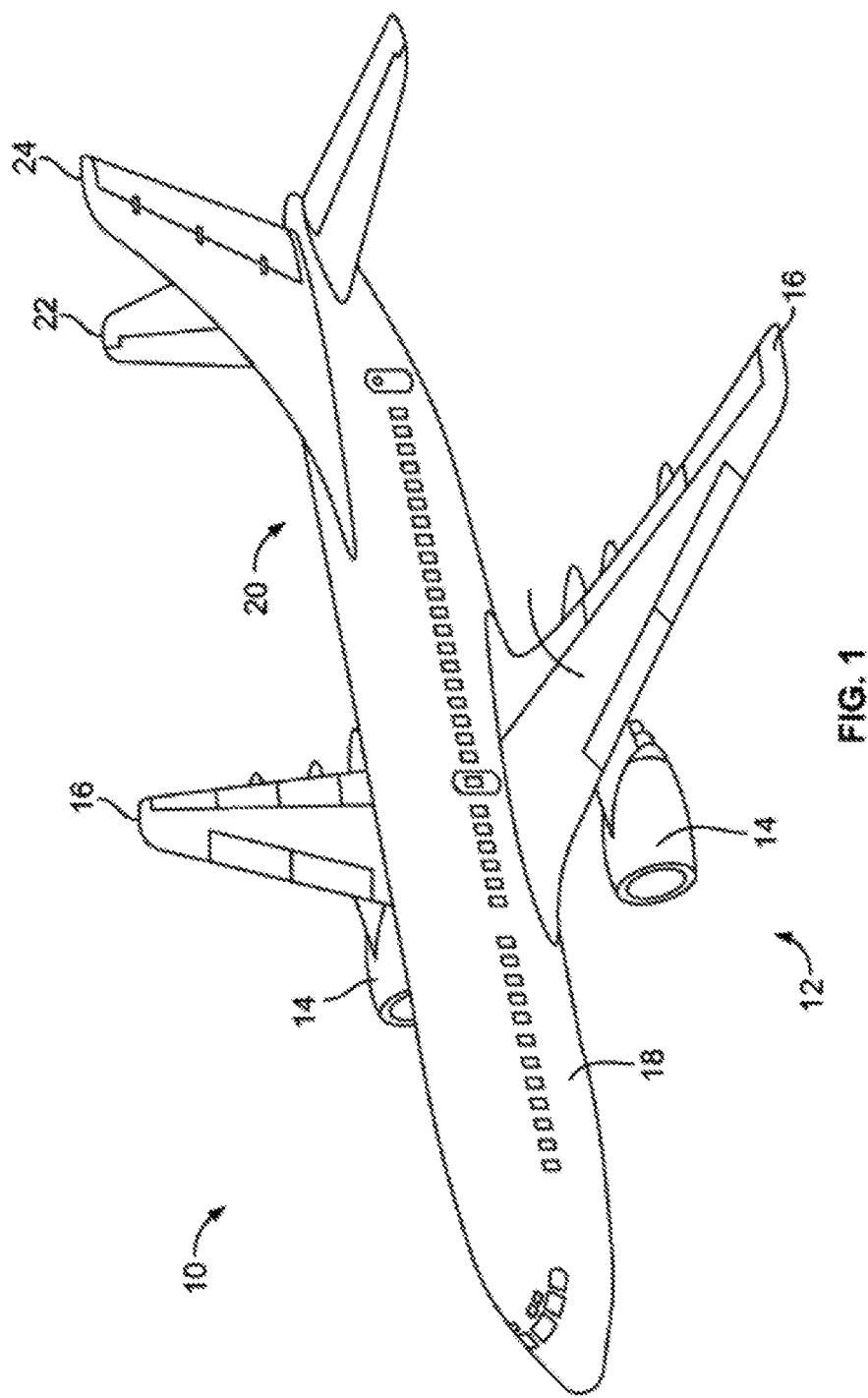
FIG. 1 is a representation of an aircraft in which an example implementation of a dry floor assembly may be employed.

Implementations as disclosed herein may be used on various floor surfaces in aircraft, trains, cruise ships, buses, portable lavatories or kitchens, or fixed facilities in buildings but for simplicity, without implying limitation, will be described for use in an aircraft as an example. FIG. 1 illustrates a perspective top view of an aircraft 10, in which the exemplary implementations may be employed. The aircraft 10 may include a propulsion system 12 that may include two turbofan engines 14, for example. Optionally, the propulsion system 12 may include more engines 14 than shown. The engines 14 are carried by wings 16 of the aircraft 10. In other implementations, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may include a cockpit, one or more work sections (for example, galleys, personnel carry-on baggage areas, and the like), one or more passenger sections (for example, first class, business class, and coach sections), and an aft section in which an aft rest area may be positioned. Each of the sections may be separated by a cabin transition area, which may include one or more class divider assemblies. The internal cabin includes one or more lavatories and implementations of the present disclosure provide systems and methods that are configured to automatically dry floors within the lavatories as examples.

Figure 2:
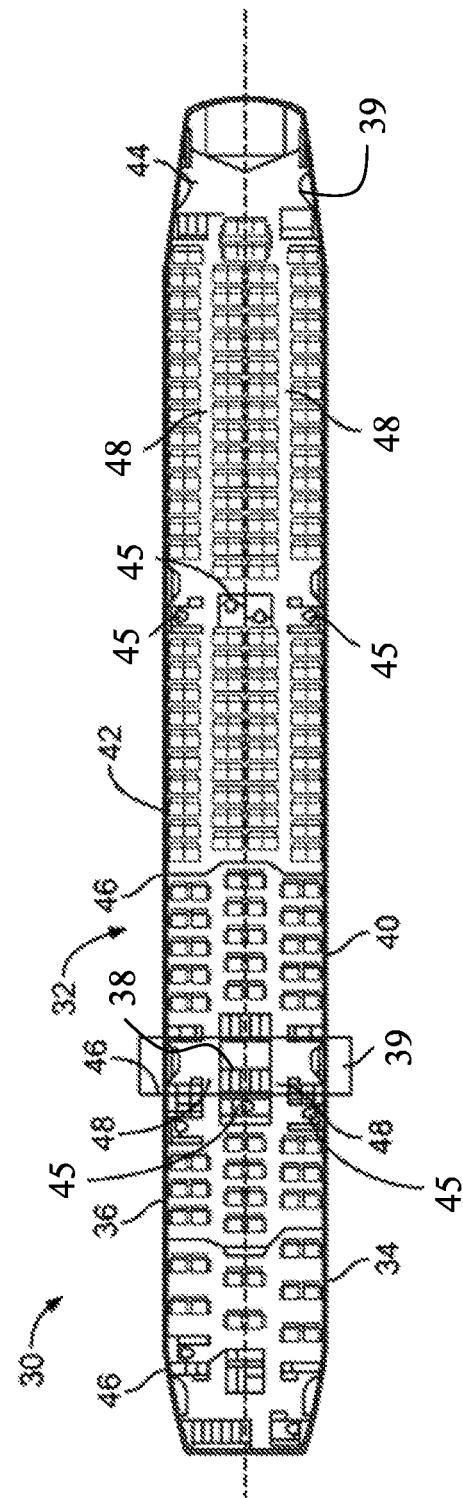
FIG. 2 is a schematic representation of the aircraft interior with example locations where the example implementation may be incorporated.

FIG. 2 illustrates a top plan view of the internal cabin 30 of the aircraft 10 of FIG. 1. The internal cabin 30 is within the fuselage 18 of the example aircraft 10. The internal cabin 30 includes multiple sections; a front section 32, a first class section 34 (or first class suites, cabins, for example), a business class section 36, a front galley station 38, which may be included in an entry way 39, an expanded economy or coach section 40, a standard economy or coach section 42, and an aft section 44. One or more lavatories 45 may be located within the internal cabin 30. The galley station 38, entry way 39 and lavatories 45 may include dry floor assemblies as discussed herein, which may be secured within a portion of the fuselage. The aft section 44 may include multiple lavatories and galley stations. It is to be understood that the internal cabin 30 may include more or less sections than shown. For example, the internal cabin 30 may not include a first class section and may include more or less galley stations than shown. Each of the sections may be separated by a cabin transition area 46, which may include class divider assemblies between aisles 48.

As shown for the example in FIG. 2, the internal cabin 30 also includes two aisles 48 that lead to the aft section 44. Aft section 44 may also include entry ways 39. Optionally, the internal cabin 30 may have less or more aisles than shown. For example, the internal cabin 30 may include a single aisle that extends through the center of the internal cabin 30 that leads to the aft section 44.

Figure 3A:
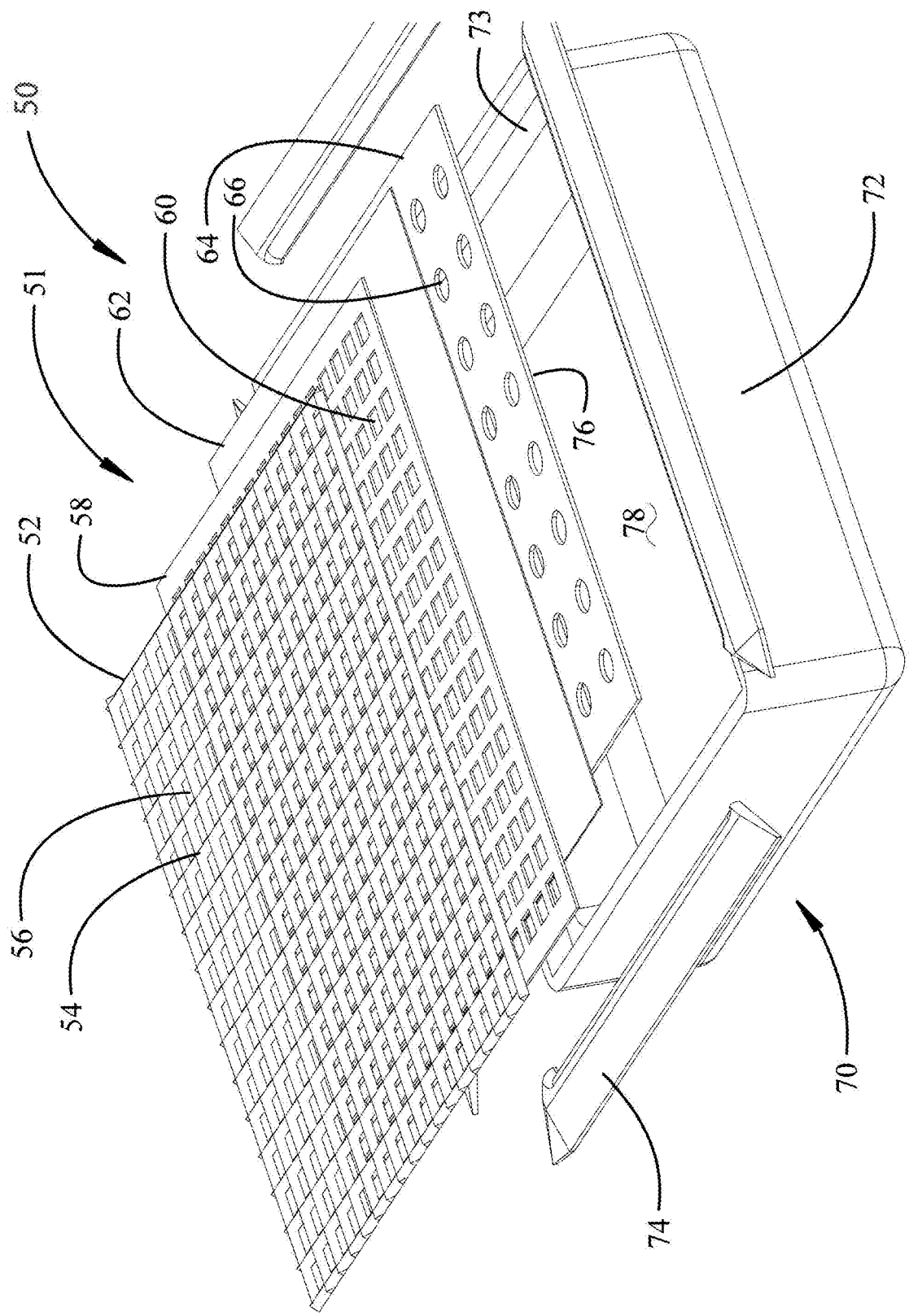
FIG. 3A is an exploded pictorial representation of a configuration of the example implementation.
Figure 3B:
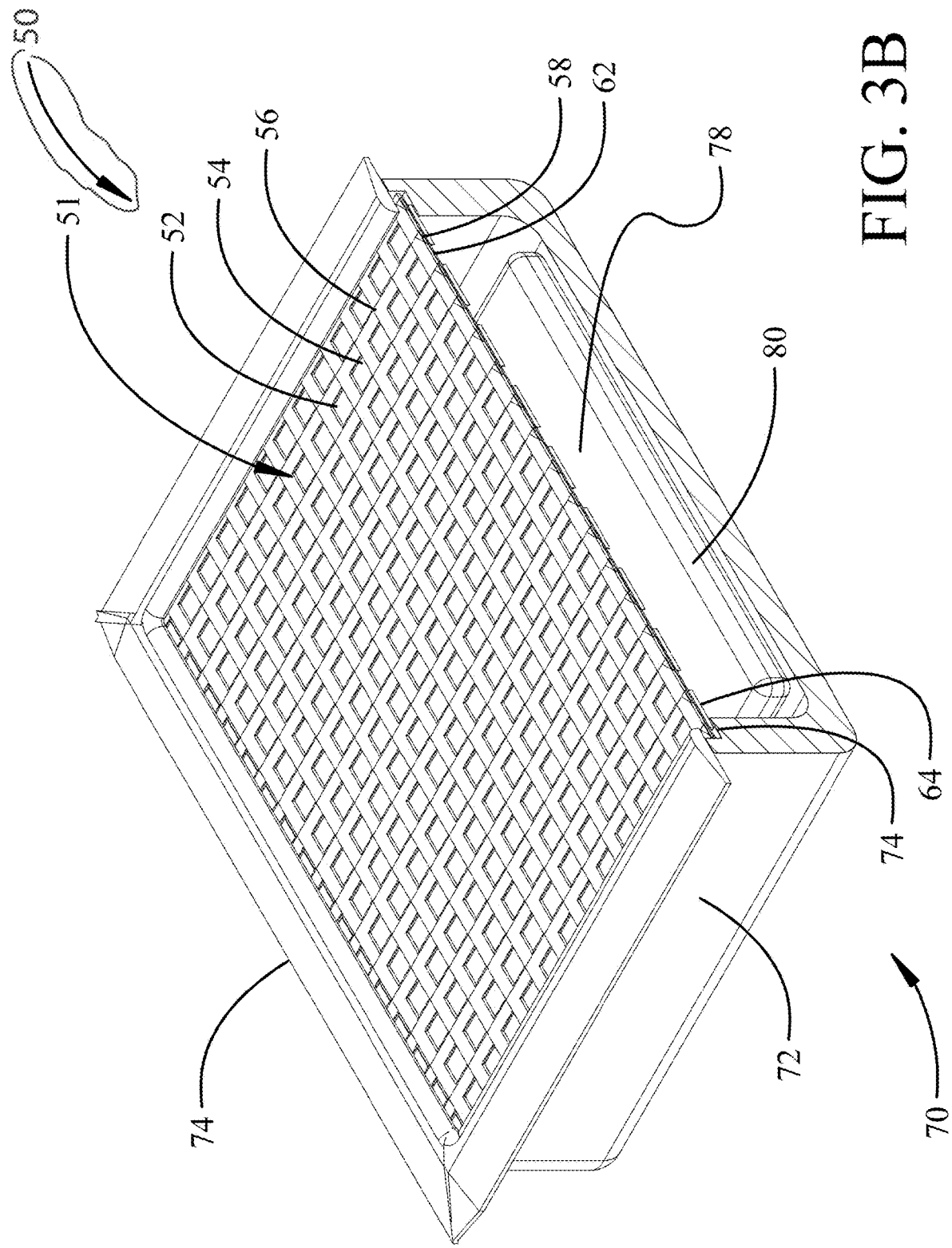
FIG. 3B is a pictorial sectioned representation of the configuration of the example implementation
Figure 4A:
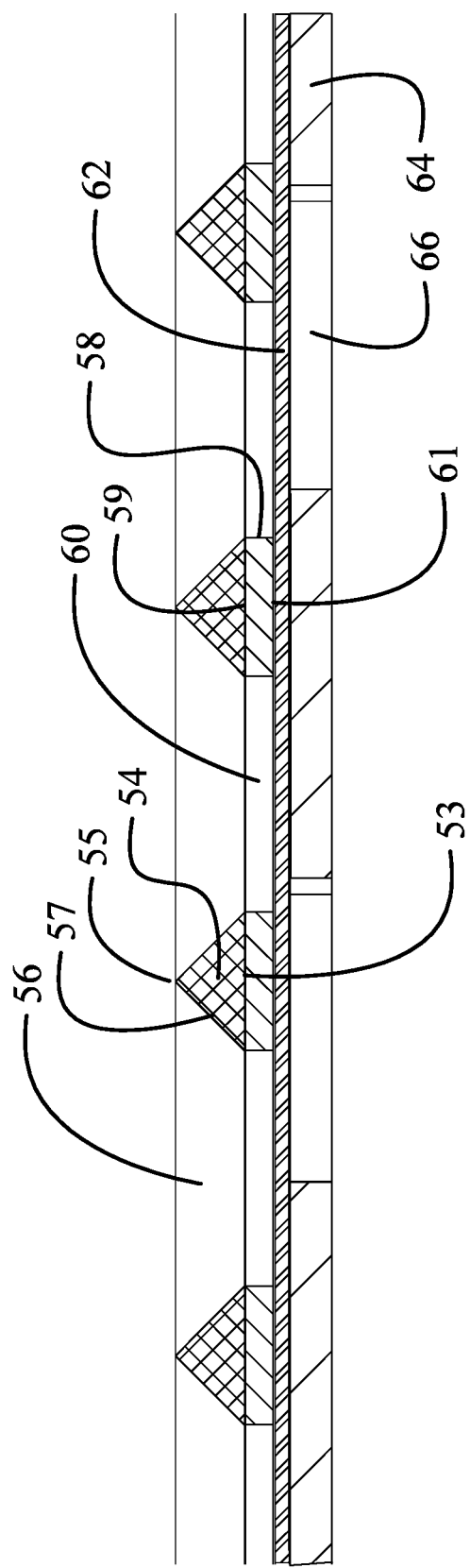
FIG. 4A is a sectional representation of details of the grid assembly of the exemplary implementation.
Figure 4B:
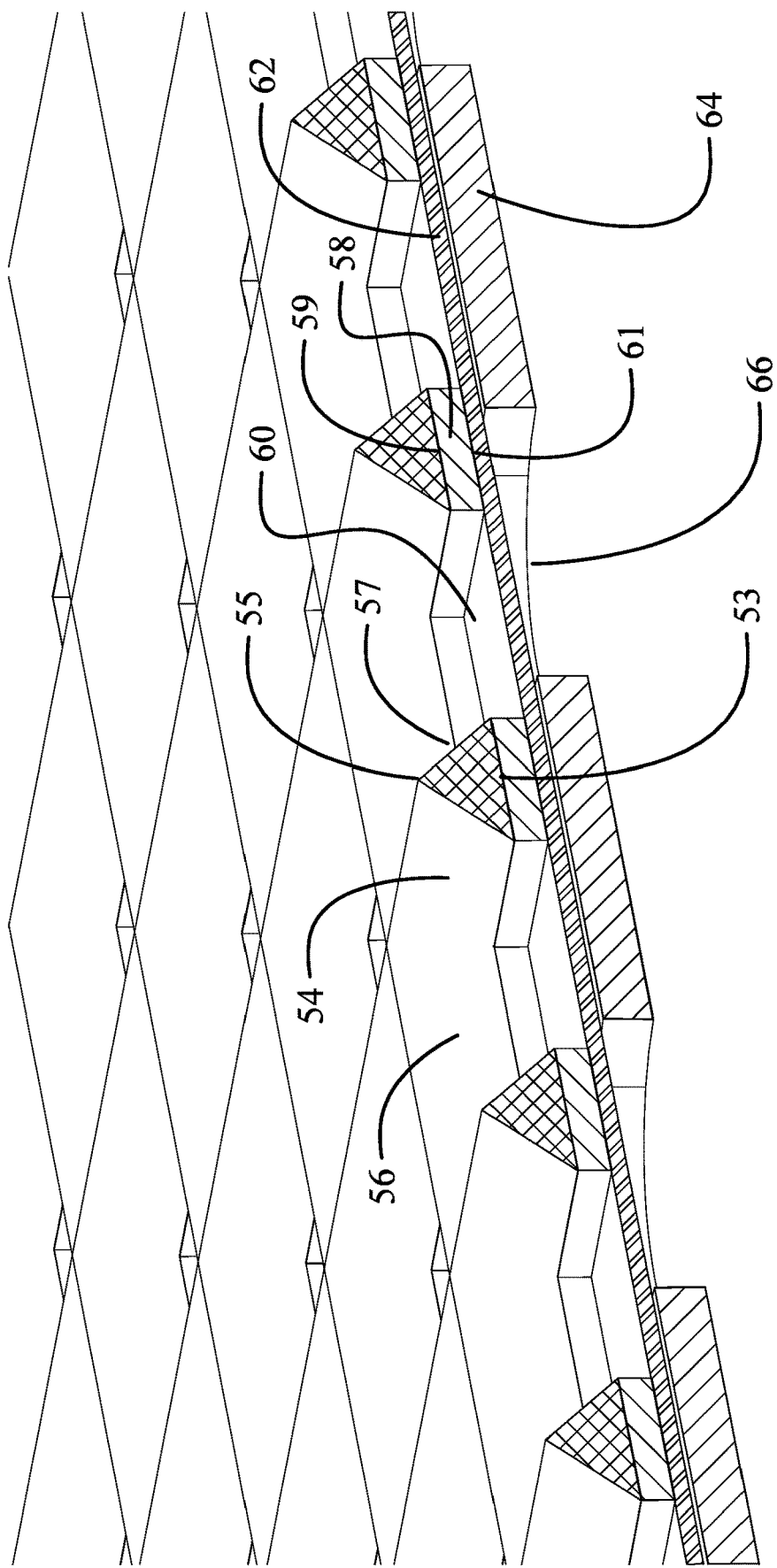
FIG. 4B is a pictorial sectional representation of the grid assembly.

An example implementation of a laminated dry floor system 50 is shown in FIGS. 3A and 3B. A grid assembly 51 includes a grid 52, a support interlayer 58, a wicking layer 62 and a base layer 64. The grid 52 has a lattice of intersecting members 54 forming a first array of apertures 56. In the example implementation, the members 54 are formed of a thermoplastic such as urethane and have a tapered cross section, triangular in the example implementation, as seen in FIGS. 4A and 4B with an upper apex 55 and a base surface 53. A coating may be employed to provide hydrophobic surfaces on the members 54, which, in combination with the tapered or sloping side surfaces 57 of members 54 extending from the upper apex 55 to the base surface 53, enhances flow of liquids through the grid 52.

Hydrophobic materials or other materials with a hydrophobic coating may alternatively be employed for the grid.

The support interlayer 58 is adhered at an upper surface 59 beneath the grid 52 to the base surface 53 of the intersecting members 54 and has a second array of apertures 60 concentrically aligned with the first array of apertures 56 in the grid. For noncircular geometries of the first and second array, "concentric alignment" is defined as alignment of the center points of the relative geometric shapes. The first array of apertures 56, second array of apertures 60 and thickness of the support interlayer, to be described subsequently, are configured to induce passage of a liquid spilled on the dry floor system 50. The first and second arrays in the example implementation are both square in shape. However, alternative geometries may be employed in one or both of the grid and support interlayer. The material of the support interlayer 58 is titanium for the example implementation. However, aluminum, stainless steel or other high strength material may alternatively be employed.

The wicking layer 62 is in contact with a lower surface 61 of the support interlayer 58 opposite the grid 52. A carbon or graphite veil (or felt) is used in the wicking layer 62 in the example implementation. Additionally, or alternatively, fiberglass may be used in the wicking layer. In the example implementation the wicking layer 62 is bonded to the lower surface 61 of the support interlayer 58.

The base layer 64 underlying a bottom surface 65 of the wicking layer 62 is configured to provide rigidity for the grid 52, support interlayer 58 and wicking layer 62 allowing persons to walk on the grid assembly 51 without deformation. The base layer 64 additionally includes a third array of apertures 66 configured to allow liquid transition from the wicking layer 62 through the base layer 64. For the example implementation the base layer is steel or other metallic material.

A pan assembly 70 receives the grid assembly 51 and secures the dry floor system 50 to the underlying floor or structure of the aircraft fuselage 18. In the example implementation, the pan assembly includes a dished pan 72 having a rim 73 configured to engage a bottom edge 76 of the base layer 64. The dished pan 72 incorporates a cavity 78. The cavity 78 is configured to collect and/or redirect liquid that passes through the grid 52. In the example implementation an absorbent pad 80 is disposed within the cavity 78. Liquid passing through the grid 52, support interlayer 58, wicking layer 62 and base layer 64 is collected in the dished pan 72. An absorbent pad 80, seen in FIG. 4B, may be housed in the cavity 78 to absorb the liquid for subsequent removal. In other implementations, no absorbent pad 80 may be used, and liquid may be allowed to accumulate in the dished pan 72. Then, at a later, convenient time (e.g., between flights and/or during a scheduled maintenance period) the liquid may be removed from the dished pan 72 (e.g., via vacuuming). It may be noted that the dished pan 72 may be separate from the flooring with which it is associated (e.g., configured as a plug-in replacement that may be retrofitted to an existing location), or, in other examples, may be an integral part of a floor system of the room or facility in which the dry floor system 50 is inserted.

Figure 5:
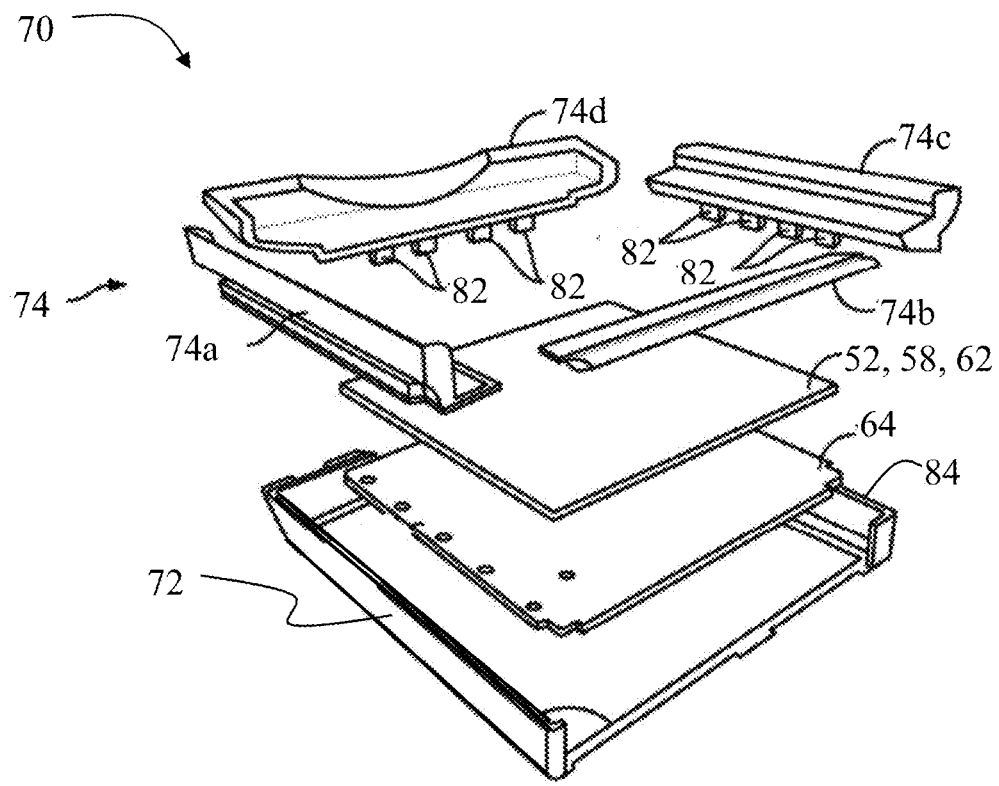
FIG. 5 is an exploded view of the example implementation with details of the pan assembly.

As seen in FIG. 5, the pan assembly 70 is configured to be placed in a floor (e.g., a floor pan of a commercial aircraft). Various surround members 74 are utilized to integrate or fair the dished pan 72 and grid assembly 51 into the floor pan, including an assist wall edging 74a, a threshold edge 74b, a side wall edging 74c, and a toilet edging 74d. For an implementation in a galley or entry, toilet edging 74d may be replaced with a second sidewall or threshold edge.

Each surround member 74 includes one or more magnets 82 that are used to secure the corresponding surround member 74 to the dished pan 72 via magnetic attraction between the magnets 82 and edges 84 of the dished pan 72 or other magnetic elements in the pan assembly 70 or grid assembly 51. In various examples, the surround members may be used to allow use of a standardized grid size, with the surround members accommodating variations from the grid size in different environments (e.g. differently sized lavatories).

Figure 6:
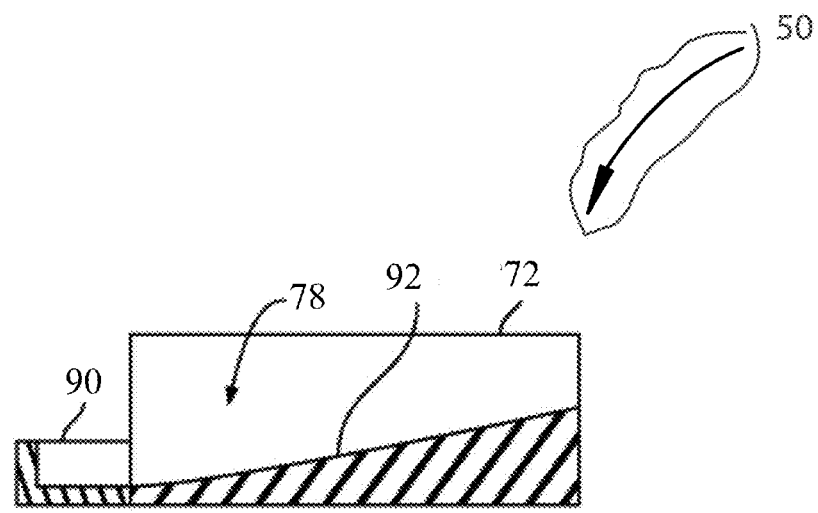
FIG. 6 is a partial section view of the dished pan with a reservoir for fluid capture.

In some examples, the pan assembly may be used to redirect liquid to an additional or supplemental reservoir. For example, FIG. 6 illustrates a side sectional view of a pan assembly formed in accordance with the example implementation. As seen in FIG. 6, the depicted example dry floor system 50 may further includes a reservoir 90 that is in fluid communication with the dished pan 72. The dished pan 72 includes a sloped floor 92 in the cavity 78 that is configured to direct fluid to a reservoir 90. The reservoir 90, for example, may be disposed off to a side of the dished pan 72, and may provide a more convenient location for removing liquid from the dry floor system 50. The reservoir 90 may be used to collect and store liquid, or, additionally or alternatively, may be used to hold an absorbent pad for the collection of liquid.

In the example implementation, the grid 52 is formed of a non-flammable material. As used herein, a non-flammable material is a material that satisfies commercial aircraft non-flammability standards or regulations. The grid 52 may be cast using a thermoset resin. As one example, 892 urethane may be used for forming the grid 52. Further, the grid 52 in various examples has a hydrophobic coating, helping to urge water to flow down the tapered surfaces of the grid 52 and toward the wicking layer 62 and dished pan 72.

Figure 7:
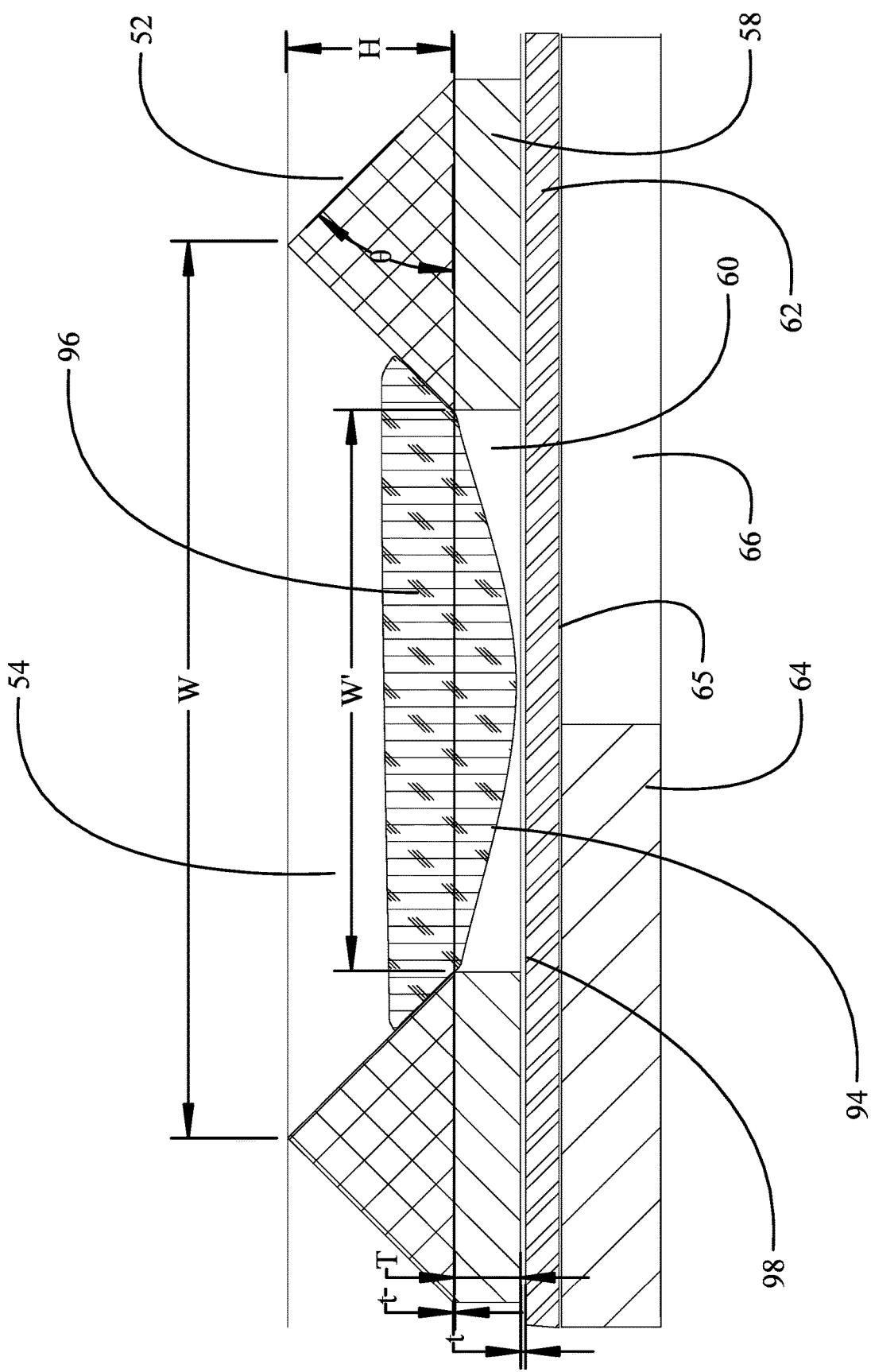
FIG. 7 is a detailed partial sectional view of the grid assembly with a fluid droplet; and, FIG. 8 illustrates a process flow diagram illustrating a method for water capture in the disclosed implementations.

The grid assembly 51 is configured to provide transmission of water or other liquids into the wicking layer 62 and then through the third array of apertures 66 in the base layer 64 into the dished pan 72. Aperture size in the first array of apertures in the grid is determined to preclude insertion of a stiletto or spiked heel on a shoe into the aperture and, consequently must be relatively small. As seen in FIG. 7, to ensure flow of essentially all water through the first array of apertures 56 in the grid 52 and the aligned second array of apertures 60 in the support interlayer 58, the support interlayer 58 and associated bond lines between the grid and support interlayer and between the support interlayer and wicking layer must have a thickness less than the depth of a domed or catenary surface 94 formed by surface tension holding a water droplet 96 in the first and second arrays of apertures 56, 60 thereby assuring contact with the upper surface 98 of the wicking layer 62 to draw the water into the wicking layer.

In the example implementation, the width, W, of each aperture the first array of apertures 56 in the grid 52 is approximately 0.27 inches (7 mm) wide and each member 54 has a height H of 0.05 inches (1.3 mm). The taper of the lattice members 54 in the grid 52 determines a width of each of the apertures in the first array of apertures 56 proximate the base surfaces 53. For the triangular cross section of the example implementation this results in a width $W'=W-(2(H/\tan \theta))$ where $\theta$ is the base angle and H is the height of the lattice members 54. Thickness, T, of the support interlayer may be defined as a function of aperture size in the grid and support interlayer. In the example implementation, using titanium, the thickness of the support interlayer to provide satisfactory wicking is 0.020 inches (0.5 mm). The bonding of the support interlayer 58 to the grid 52 and wicking layer 62 to the support interlayer 58 is accomplished with epoxy and provides bond line thickness, t, of between 0.0005 and 0.005 inches, nominally, 0.001 inches. Use of alternative materials such as stainless steel allow thinner support interlayer thickness of 0.005 to 0.010 inches which accommodates smaller aperture widths, if necessary.

Figure 8:
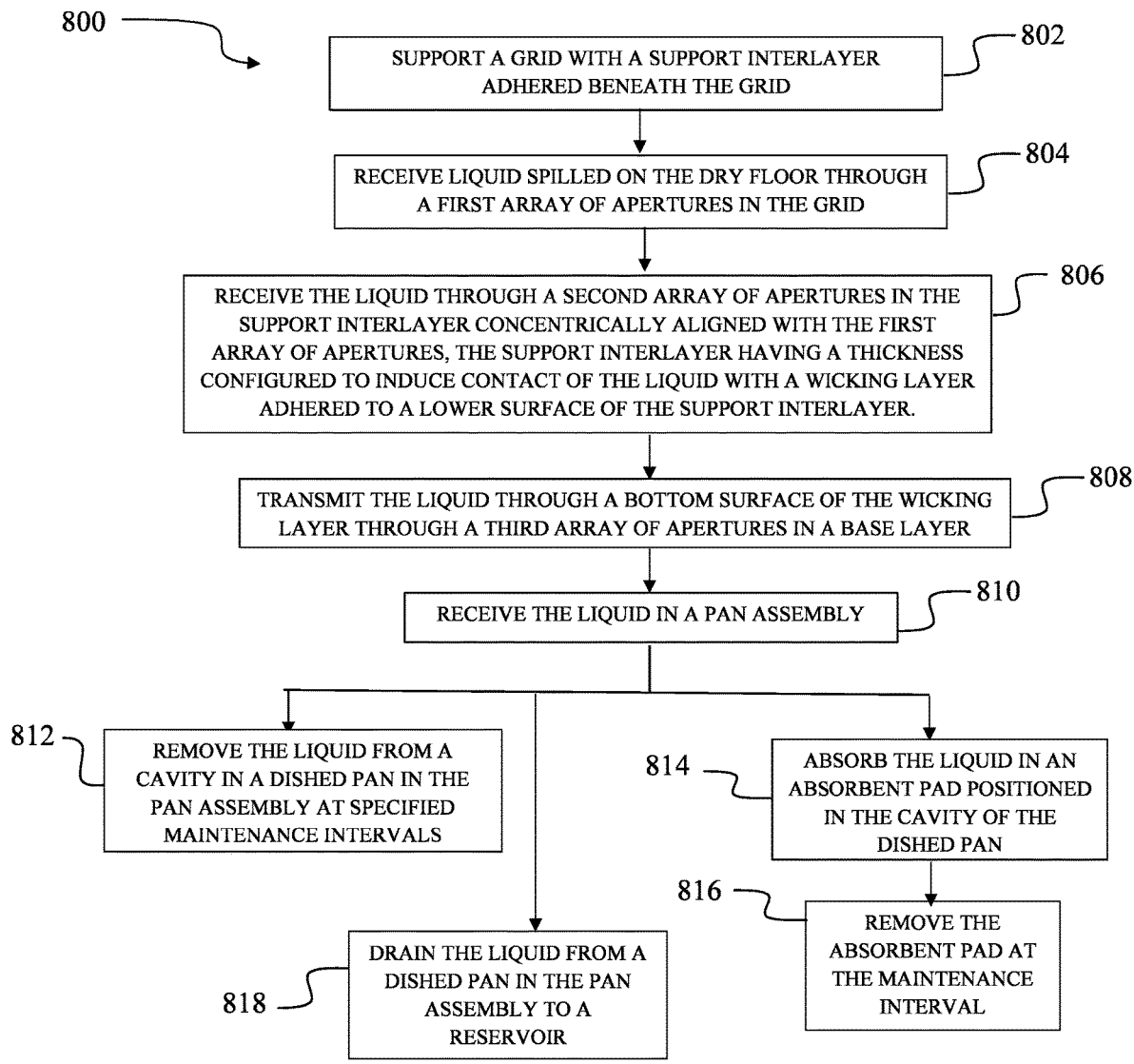

The disclosed implementation provides a method 800 for maintaining a dry floor as shown in FIG. 8. A grid 52 is supported with a support interlayer 58 adhered beneath the grid, step 802. Liquid spilled on the dry floor is received in the grid 52, step 804. The grid 52 has a lattice of intersecting members 54 forming a first array of apertures 56 and the support interlayer 58 has a second array of apertures 60 concentrically aligned with the first array of apertures. The liquid is received through the second array of apertures 60, step 806, with the support interlayer 58 having a thickness configured to induce contact of the liquid with a wicking layer 62 adhered to a lower surface 61 of the support interlayer 58. The liquid is then transmitted from a bottom surface 65 of the wicking layer 62 through a third array of apertures 66 in a base layer 64 beneath the wicking layer, step 808. The liquid is then received in a pan assembly 70, step 810. The liquid may then be removed from a cavity 78 in a dished pan 72 in the pan assembly at specified maintenance intervals, step 812, or absorbed in an absorbent pad 80 positioned in the cavity of the dished pan, step 814. The absorbent pad 80 may then be removed at the maintenance interval, step 816. Alternatively, the liquid may be drained from the dished pan 72 to a reservoir 90, step 818.

Clause 1: A laminated dry floor system comprising a grid having a lattice forming a first array of apertures; a support interlayer adhered beneath the grid and having a second array of apertures in alignment with the first array of apertures, the first array of apertures, second array of apertures and thickness of the support interlayer configured to induce passage of a liquid; a wicking layer in contact with the support interlayer opposite the grid; a base layer underlying the wicking layer; and a pan assembly configured to receive the base layer.

Clause 2: The laminated dry floor system as defined in Clause 1 wherein the first array of apertures and the second array of apertures are concentrically aligned.

Clause 3: The laminated dry floor system as defined in Clause 1 or 2 wherein the grid comprises a lattice of intersecting members forming the first array of apertures, each of the intersecting members having a tapered cross section with an upper apex and a base surface.

Clause 4: The laminated dry floor system as defined in Clause 3 wherein the tapered cross section is triangular with sloping side surfaces extending from the upper apex to the lower surface.

Clause 5: The laminated dry floor system as defined in any of Clauses 1-4 wherein the grid is a thermoplastic.

Clause 6: The laminated dry floor system as defined in Clause 5 wherein the thermoplastic is urethane.

Clause 7: The laminated dry floor system as defined in any of Clauses 1-6 wherein the support interlayer is titanium.

Clause 8: The laminated dry floor system as defined in any of Clauses 1-7 wherein the support interlayer is aluminum or stainless steel.

Clause 9: The laminated dry floor system as defined in any of Clauses 1-8 wherein the support interlayer has a thickness, T, and each aperture in the first array of apertures in the grid has a width, W, and $T \leq 0.194$ W.

Clause 10: The laminated dry floor system as defined in Clause 1 wherein the pan assembly comprises a dished pan having a rim configured to engage a bottom edge of the base layer, the dished pan having a cavity configured to collect liquid that passes through the grid, and a plurality of surround members configured to fair the dished pan into a floor in which the pan assembly is installed.

Clause 11: A grid assembly for a dry floor system, the grid assembly comprising a grid having a lattice forming a first array of apertures; a support interlayer adhered beneath the grid and having a second array of apertures in alignment with the first array of apertures, the first array of apertures, second array of apertures and thickness of the support interlayer configured to induce passage of liquid; a wicking layer in contact with the support interlayer opposite the grid; and a base layer underlying the wicking layer.

Clause 12: The grid assembly as defined in Clause 11 wherein the grid comprises a lattice of intersecting members forming the first array of apertures, each of the intersecting members having a triangular cross section with sloping side surfaces extending from an upper apex to a lower surface and wherein the first array of apertures and the second array of apertures are concentrically aligned.

Clause 13: The grid assembly as defined in Clause 11 or 12 wherein the grid is a thermoplastic.

Clause 14: The grid assembly as defined in any of Clauses 11-13 wherein the support interlayer is titanium.

Clause 15: The grid assembly as defined in any of Clauses 11-14 wherein the support interlayer has a thickness, T, and each aperture in the first array of apertures in the grid has a width, W, and T≤0.194 W.

Clause 16: A method for maintaining a dry floor, the method comprising supporting a grid with a support interlayer adhered beneath the grid; receiving liquid in the grid, the grid having a lattice forming a first array of apertures, said support interlayer having a second array of apertures concentrically aligned with the first array of apertures; and receiving the liquid through the second array of apertures, the support interlayer having a thickness configured to induce contact of the liquid with a wicking layer adhered to a lower surface of the support interlayer.

Clause 17: The method of Clause 16 further comprising transmitting the liquid from a bottom surface of the wicking layer through a third array of apertures in a base layer beneath the wicking layer.

Clause 18: The method of Clause 17 further comprising receiving the liquid in a pan assembly.

Clause 19: The method of Clause 18 further comprising absorbing the liquid in an absorbent pad positioned in a cavity of a dished pan in the pan assembly.

Clause 20: The method of Clause 18 or 19 further comprising draining the liquid from a dished pan in the pan assembly to a reservoir.

Having now described various implementations in detail as required by the patent statutes, those skilled in the art will recognize modifications and substitutions to the specific implementations disclosed herein. Such modifications are within the scope and intent of the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. As used herein the terms "upper" and "lower", "left" and "right", "longitudinal" and "lateral", "forward" and "aft" are employed to describe relative positioning and other than for the specific implementations disclosed may be substituted with appropriate descriptors such as "first" and "second", "top" and "bottom" or "right" and "left" depending on orientation of actual implementation.

What is claimed is:

1. A laminated dry floor system comprising:
   a grid having a lattice of intersecting members forming a first array of apertures, where each of the intersecting members have a tapered cross section that is triangular with an upper apex having a height (H) and sloping side surfaces extending from the upper apex to a base surface of the grid to define a base angle (θ), such that each aperture of the first array is defined by a width (W) between the upper apexes of the intersecting members; and a width (W') between the intersecting members proximate the base surface of the grid, wherein W is greater than W';
   a support interlayer adhered at an upper surface beneath the grid to a base surface of the grid and having a second array of apertures in concentric alignment with the first array of apertures, where the first array of apertures, second array of apertures and thickness of the support interlayer configured to induce passage of a liquid, W is approximately 0.27 inches, and W'=W−(2(H/tan θ));
   a wicking layer in contact with a lower surface of the support interlayer opposite the grid;
   wherein the support interlayer and associated bond lines between the grid and support interlayer and between the support interlayer and wicking layer have a thickness (T) which assures contact betweent an upper surface of the wicking layer and a catenary surface of a water droplet held in the first and second array of apertures by surface tension where T≤0.030 inches;
   a base layer underlying the wicking layer; and
   a pan assembly configured to receive the base layer.

2. The laminated dry floor system as defined in claim 1 wherein the grid is a thermoplastic.

3. The laminated dry floor system as defined in claim 2 wherein the thermoplastic is urethane.

4. The laminated dry floor system as defined in claim 1 wherein the support interlayer is titanium.

5. The laminated dry floor system as defined in claim 1 wherein the support interlayer is aluminum or stainless steel.

6. The laminated dry floor system as defined in claim 1 wherein the pan assembly comprises:
   a dished pan having a rim configured to engage a bottom edge of the base layer, the dished pan having a cavity configured to collect liquid that passes through the grid, and
   a plurality of surround members configured to fair the dished pan into a floor in which the pan assembly is installed.

7. The laminated dry floor system as defined in claim 1 wherein the grid is a thermoplastic and the support interlayer is titanium.

8. The laminated dry floor system as defined in claim 1 wherein the grid is a thermoplastic and the support interlayer is aluminum or stainless steel.

9. A grid assembly for a dry floor system, the grid assembly comprising:
   a grid having a lattice of intersecting members forming a first array of apertures, where each of the intersecting members have a tapered cross section that is triangular with an upper apex having a height (H) and sloping side surfaces extending from the upper apex to a base surface of the grid to define a base angle (θ), such that each aperture of the first array is defined by a width (W) between the upper apexes of the intersecting members, and a width (W') between the intersecting members proximate the base surface of the grid, wherein W is greater than W';

a support interlayer adhered at an upper surface beneath the grid to the base surface of the grid and having a second array of apertures in concentric alignment with the first array of apertures, wherein the first array of apertures, second array of apertures and thickness of the support interlayer are configured to induce passage of liquid, W is approximately 0.27 inches and $W'=W-(2(H/\tan \theta))$;

a wicking layer in contact with a lower surface of the support interlayer opposite the grid;

wherein the support interlayer and associated bond lines between the grid and support interlayer and between the support interlayer and wicking layer have a thickness (T) which assures contact with the upper surface of the wicking layer and a catenary surface of a water droplet held in the first and second array of apertures by surface tension where $T \leq 0.030$ inches; and a base layer underlying the wicking layer.

10. The grid assembly as defined in claim 9 wherein the grid is a thermoplastic.

11. The grid assembly as defined in claim 9 wherein the support interlayer is titanium.

12. The grid assembly as defined in claim 9 wherein the grid is a thermoplastic and the support interlayer is titanium.

13. The laminated dry floor system as defined in claim 9 wherein the support interlayer is aluminum or stainless steel.

14. The laminated dry floor system as defined in claim 9 wherein the grid is a thermoplastic and the support interlayer is aluminum or stainless steel.

15. The laminated dry floor system as defined in claim 9 wherein the bond lines are epoxy.

16. A method for maintaining a dry floor using a grid assembly for a dry floor system as defined in claim 9, the method comprising:

supporting the grid with the support interlayer adhered beneath the grid;

receiving liquid in the first array of apertures in the grid, and receiving the liquid through the second array of apertures, with the catenary surface of a water droplet of the liquid held in the first and second array of apertures contacting the upper surface of the wicking layer.

17. The method of claim 16 further comprising transmitting the liquid from a bottom surface of the wicking layer through a third array of apertures in a base layer beneath the wicking layer.

18. The method of claim 17 further comprising receiving the liquid in a pan assembly.

19. The method of claim 18 further comprising absorbing the liquid in an absorbent pad positioned in a cavity of a dished pan in the pan assembly.

20. The method of claim 18 further comprising draining the liquid from a dished pan in the pan assembly to a reservoir.

* * * * *

UNITED STATES PATENT AND TRADEMARK OFFICE
CERTIFICATE OF CORRECTION

| | |
|---|---|
| PATENT NO. | : 11,745,846 B2 |
| APPLICATION NO. | : 17/488534 |
| DATED | : September 5, 2023 |
| INVENTOR(S) | : Jamie Childress |

It is certified that error appears in the above-identified patent and that said Letters Patent is hereby corrected as shown below:

In the Claims

In Claim 1, Line 27 "betweent" is corrected to read "between".

In Claim 13, Line 1 "The laminated dry floor system as defined in claim 9" is corrected to read "The grid assembly as defined in claim 9".

In Claim 14, Line 1 "The laminated dry floor system as defined in claim 9" is corrected to read "The grid assembly as defined in claim 9".

In Claim 15, Line 1 "The laminated dry floor system as defined in claim 9" is corrected to read "The grid assembly as defined in claim 9".

Signed and Sealed this
Ninth Day of April, 2024

Katherine Kelly Vidal
*Director of the United States Patent and Trademark Office*